US006646858B2

(12) United States Patent
Dingenotto et al.

(10) Patent No.: US 6,646,858 B2
(45) Date of Patent: Nov. 11, 2003

(54) CAPACITOR BODY AND A FILTER PLUG INCLUDING A CAPACITOR FORMED WITH THE CAPACITOR BODY

(75) Inventors: Meinolf Dingenotto, Schloss Holte-Stukenbrock (DE); Jörg Kühle, Welver-Borgeln (DE)

(73) Assignee: Filtec Filtertechnologie fuer die Electronikindustrie GmbH, Lippstadt (DE)

( * ) Notice: Subject to any disclaimer, the term of this patent is extended or adjusted under 35 U.S.C. 154(b) by 0 days.

(21) Appl. No.: 10/292,846

(22) Filed: Nov. 12, 2002

(65) Prior Publication Data

US 2003/0090856 A1 May 15, 2003

(30) Foreign Application Priority Data

Nov. 9, 2001 (DE) ........................................ 201 18 263

(51) Int. Cl.[7] .......................... H01G 4/35; H01G 4/005
(52) U.S. Cl. ..................... 361/302; 361/303; 361/306.1
(58) Field of Search ........................... 361/301.2, 301.4, 361/302, 303, 304, 306.1, 306.2, 307, 308.2, 311, 321.6; 333/182–185

(56) References Cited

U.S. PATENT DOCUMENTS

| | | | | |
|---|---|---|---|---|
| 847,446 A | | 3/1907 | Strom | |
| 3,538,464 A | * | 11/1970 | Walsh | 333/182 |
| 3,808,478 A | * | 4/1974 | Winkler | 361/302 |
| 4,260,966 A | | 4/1981 | Boutros | |
| 4,769,527 A | | 9/1988 | Hart et al. | |
| 4,916,576 A | | 4/1990 | Herbert et al. | |
| 5,078,914 A | | 1/1992 | Ambros et al. | |
| 5,242,318 A | | 9/1993 | Plass | |
| 5,261,829 A | | 11/1993 | Fusselman et al. | |
| 5,635,775 A | | 6/1997 | Colburn et al. | |
| 5,689,180 A | | 11/1997 | Carlson | |
| 5,817,533 A | | 10/1998 | Sen et al. | |
| 5,903,431 A | | 5/1999 | Wilmot | |
| 5,923,523 A | | 7/1999 | Herbert | |
| 6,396,678 B1 | | 5/2002 | Meppelink et al. | |
| 6,437,664 B1 | | 8/2002 | Meppelink et al. | |

FOREIGN PATENT DOCUMENTS

| | | | | |
|---|---|---|---|---|
| DE | 28 55 784 A1 | | 6/1979 | |
| DE | 299 14 584 U1 | | 11/2000 | |
| DE | 199 39 379 A1 | | 3/2001 | |
| DE | 199 58 484 A1 | | 4/2001 | |
| EP | 1 077 514 A3 | | 2/2001 | |
| EP | 1 079 400 A3 | | 2/2001 | |
| JP | 6-97002 | * | 4/1994 | H01G/4/42 |
| JP | 11 214 206 A | | 8/1999 | |

* cited by examiner

*Primary Examiner*—Dean A. Reichard
*Assistant Examiner*—Eric Thomas
(74) *Attorney, Agent, or Firm*—Laurence A. Greenberg; Werner H. Stemer; Ralph E. Locher

(57) ABSTRACT

The invention relates to a monolithically designed ceramic capacitor body for multiple capacitors. The capacitor body includes: a base plate provided with a metal coating, the base plate formed with a plurality of through-channels, the base plate having a first side and a second side; and a plurality of individual column-shaped capacitors each including at least a first column element extending outward from the first side of the base plate and a second column element aligned with the first column element and extending outward from the second side of the base plate. The invention also relates to a capacitor provided with the capacitor body and to filter plug provided with the capacitor.

16 Claims, 7 Drawing Sheets

CAPACITOR BODY AND A FILTER PLUG INCLUDING A CAPACITOR FORMED WITH THE CAPACITOR BODY

BACKGROUND OF THE INVENTION

Field of the Invention

The invention relates to a capacitor body for multiple capacitors in which the capacitor body has a monolithic design composed of a ceramic material. A base plate is provided with individual capacitors in the form of columns. The invention also relates to a capacitor that is produced with such a capacitor body and to a filter plug with such a capacitor.

Issued German Patent Application DE 199 39 379 discloses a multiple capacitor whose capacitor body is produced monolithically from a ceramic material and whose relative dielectric constant may be not only in the range of low values from $10^0$ to $10^2$, but also in the range of high values above $10^3$. The production thereof is performed by casting, spinning, or injection molding. In this multiple capacitor, the capacitor body is designed such that the individual capacitors are placed on a base plate, like columns. In order to protect these columns, the entire arrangement is surrounded by a protective ring that extends from the base plate to the top of the columns.

Each of these column-like individual capacitors has a through-channel through which the associated signal conductor is passed. In one embodiment, the signal conductor rests on the inner wall of the through-channel and forms the signal coating of the capacitor. In another embodiment, the signal conductor is at a distance from the inner wall, which is covered with a metal coating which is itself electrically connected to the signal conductor and in this case forms the signal coating. The opposing electrode, which is connected as a ground coating, is formed by the metallic coating that is applied to the outer walls of the columns, is passed over the side of the base plate associated with the columns, and has side connecting surfaces. Particularly for use in the very high frequency band above 1 GHz, multiple bodies such as these with such capacitor bodies have been proven to be expedient, but they have the disadvantage that machining of such ceramic bodies in the unfired state, that is to say as "green bodies" leads to fracture failures or the like.

SUMMARY OF THE INVENTION

It is accordingly an object of the invention to provide a capacitor body, a capacitor provided with the capacitor body, and a filter plug provided with the capacitor, which overcome the above-mentioned disadvantages of the prior art apparatus of this general type.

In particular, it is an object of the invention to provide a capacitor body of the generic type which, while retaining the advantageous electronic characteristics, is more robust when machined and allows low-cost production.

With the foregoing and other objects in view there is provided, in accordance with the invention, a monolithically designed ceramic capacitor body for multiple capacitors. The capacitor body includes: a base plate provided with a metal coating, the base plate formed with a plurality of through-channels, the base plate having a first side and a second side; and a plurality of individual column-shaped capacitors each including at least a first column element extending outward from the first side of the base plate and a second column element aligned with the first column element and extending outward from the second side of the base plate.

In accordance with an added feature of the invention, each one of the plurality of the column-shaped capacitors has an overall length; and the first column element has a length in a range from ⅓ to ⅔ of the overall length.

In accordance with an additional feature of the invention, the second column element has a length in a range from ⅓ to ⅔ of the overall length.

In accordance with another feature of the invention, a protective ring surrounds the base plate and is formed integral with the base plate.

In accordance with a further feature of the invention, each one of the plurality of the column-shaped capacitors has opposing end faces defining planes; and the protective ring is not guided past the planes of the end faces.

With the foregoing and other objects in view there is also provided, in accordance with the invention, a capacitor including: a plurality of insert pins; and the capacitor body described above. The plurality of the through-channels have inner surfaces provided with metallization. The metallization forms signal plates of capacitors or is conductively connected to signal plates. At least the first side of the base plate is provided with metallization forming a ground coating for being held at a ground potential. The plurality of the insert pins include a plug pin, a plug socket or a soldering or crimping attachment. The plurality of the insert pins are inserted into the plurality of the through-channels, and each of the plurality of the insert pins has a shank that is pres fit into the plurality of the through-channels.

In accordance with an added feature of the invention, the second side of the base plate is provided with metallization.

With the foregoing and other objects in view there is also provided, in accordance with the invention, a filter plug, including: a capacitor including a plurality of insert pins, and the capacitor body described above; a housing having an upper shell and a lower shell, the capacitor inserted into the housing; and a molding resting on the capacitor and securing the capacitor in the housing. The plurality of the through-channels have inner surfaces provided with metallization. The metallization forms signal plates of capacitors or is conductively connected to signal plates. At least the first side of the base plate is provided with metallization forming a ground coating for being held at a ground potential. Each one of the plurality of the insert pins includes a plug pin, a plug socket or a soldering or crimping attachment. The plurality of the insert pins are inserted into the plurality of the through-channels. Each one of the plurality of the insert pins has a shank that is pres fit into one of the plurality of the through-channels.

According to the invention, the columns of the individual capacitors extend outward on both sides of the base plate as aligned column elements. This base plate is thus moved inward with respect to the prior art. As a result, the through-channels align in pairs in such a way that each of the individual capacitors, which are made up of two sub-columns, acquire a through-channel for passing a conductor therethrough. The column elements advantageously extend in the ratio of ⅓:⅔ to ½:½ on both sides of the base plate, which is moved inward. This arrangement reduces the size of the free height of the columns to approximately one-third to approximately one-half, so that the lever arm that acts during the machining of the end surfaces of the column elements is also correspondingly reduced in size. The forces that occur during machining of the end surfaces thus act on the base plate only with a torque that is reduced in a corresponding way to the reduced lever arm, thus eliminating the risk that a column will tear off, for example, when grinding the end surface.

The metallization on the inner walls of the through-channels is applied in the same way as the metallization on the outer walls and on the base plate in the normal manner, for example by covering them with palladium seeds using ionophoresis and subsequently performing nickel and gold plating. In this case, the parts that are not intended to be metallized, for example, the end faces of the columns, are covered.

While, in the prior art capacitor body, the base plate is arranged at the end with respect to the column, it is moved inward in the inventive capacitor body. In the prior art capacitor body, there are no problems in leaving out that part of the through-channel located in the area of the base plate (which is located on the capacitor columns) from the metallization, so that there is no capacitor signal plate there that could lead to parasitic coupling capacitances. When the base plate is moved inward, it is also possible in a similar manner to leave out the metallization in those areas of the inner wall of the through-channels that can be associated with the base plate. However, investigations have shown that the metallization that is connected to ground forms a continuously conductive path on the outer faces of the base plate, whose shielding effect suppresses parasitic transmissions between adjacent individual capacitors.

A protective ring surrounding the base plate makes it more robust, so that the base plate can also be kept very thin. In conjunction with the shield provided by the metallization supplied on both sides, this leads to a further reduction in the parasitic coupling capacitances and hence to a multiple capacitor with extremely low crosstalk. In this case, it is self-evident that there is no need for such a protective ring for multiple capacitors that are intended for installation.

Plug/socket inserts are inserted into the through-channels. These inserts are advantageously designed such that they are inserted into the through-channels in an interlocking manner. Each of the shanks of these inserts makes electrical contact with the metallization that is introduced into the associated through-channel forming the respective signal plate of the capacitor. The inserts are thus mechanically held in the through-channels and are electrically connected to the associated plate of the respective capacitor.

A capacitor such as this can advantageously be used to produce filter plug connectors. The capacitor with the inserts is held between two shells, which form the housing of the filter plug connector. It is supported by a molding with respect to at least one of the shells. In this case, this molding has projections on its side facing the capacitor, which fill the recesses in the capacitor body, so that the molding is connected in an interlocking manner to the capacitor body of the capacitor. This results in an increase in the mechanical robustness of the plug connector. This molding is composed of an electrically insulating material whose dielectric constant is advantageously as small as possible.

Other features which are considered as characteristic for the invention are set forth in the appended claims.

Although the invention is illustrated and described herein as embodied in a capacitor body and a filter plug with a capacitor provided with the capacitor body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
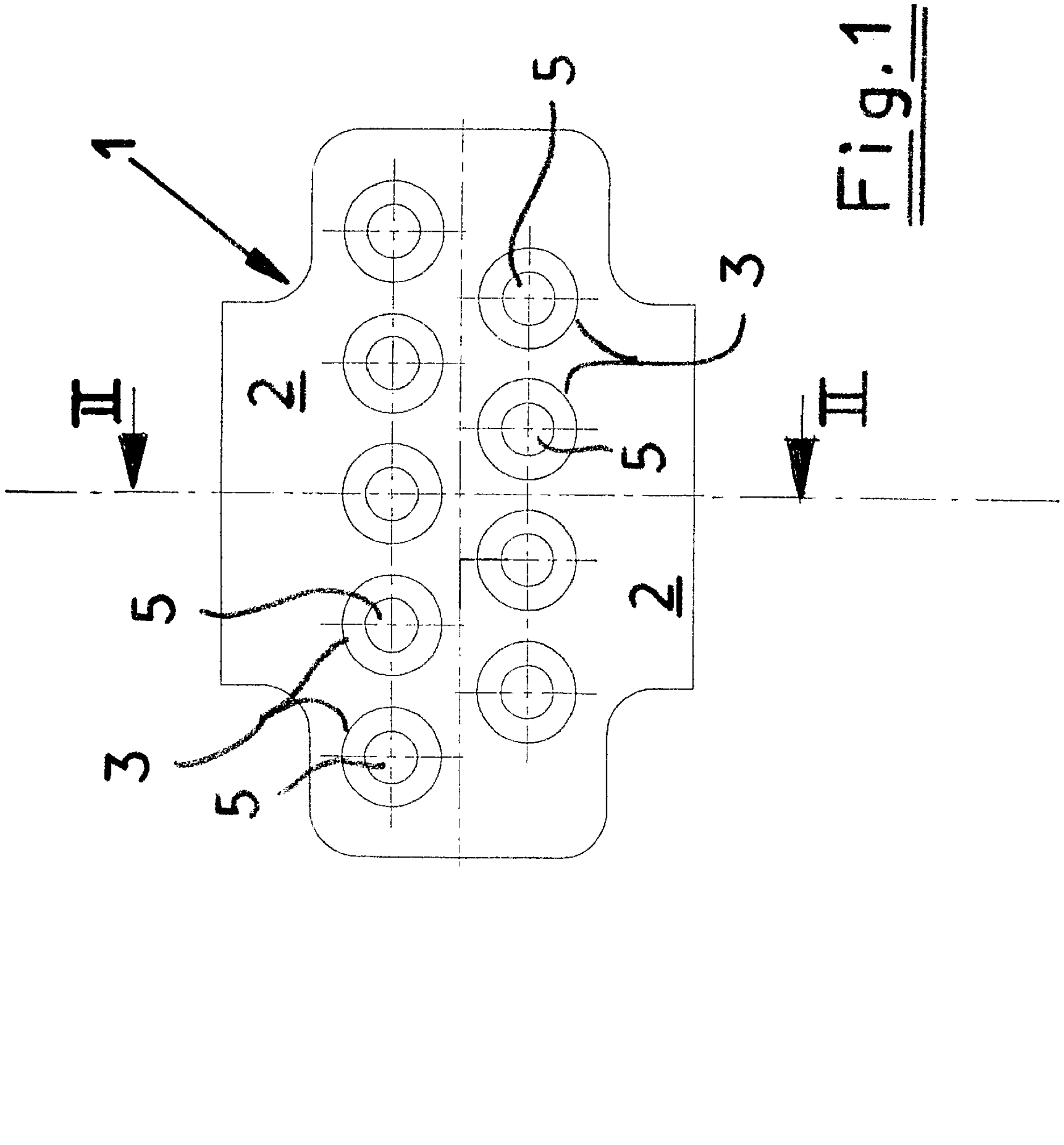
FIG. 1 is a plan view of a capacitor body having an approximately centrally arranged base plate and column-like individual capacitors.
Figure 2:
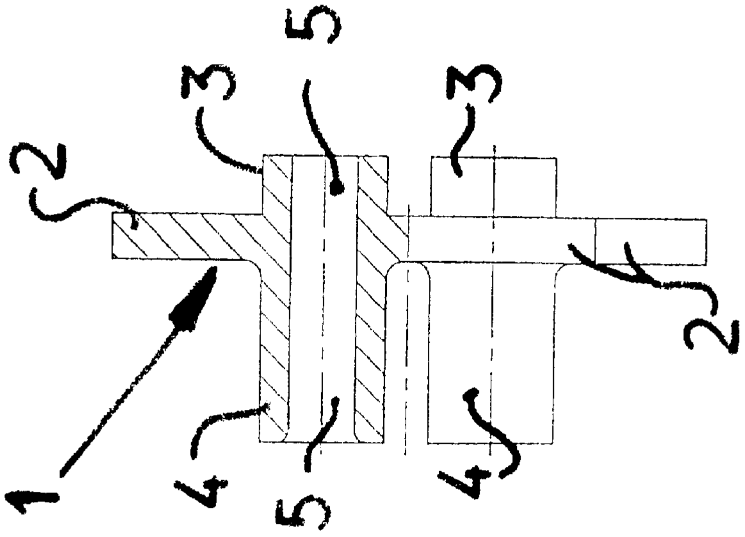
FIG. 2 is a partial sectional view of the capacitor body shown in FIG. 1.
Figure 5:
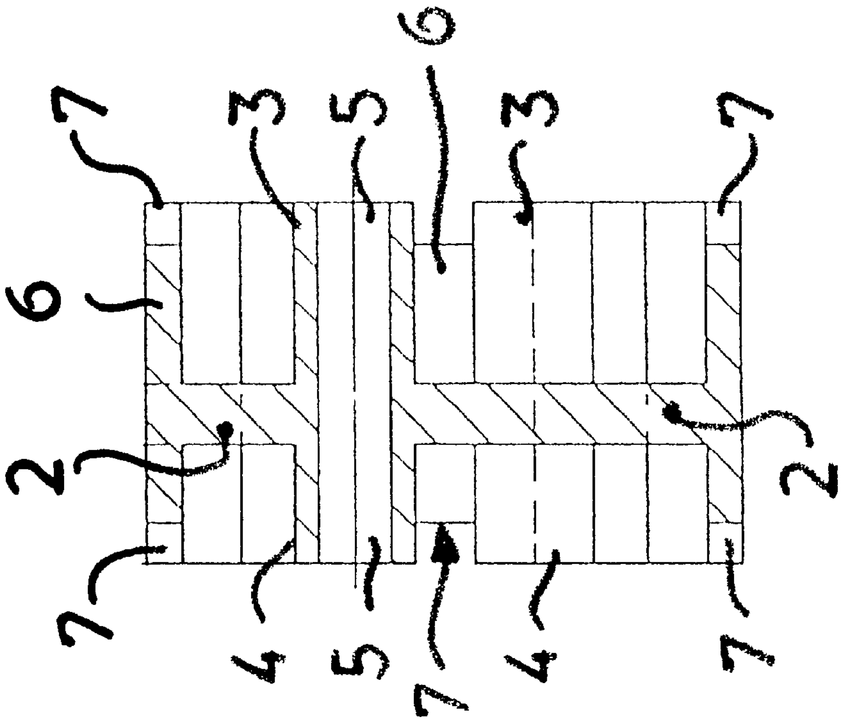
FIG. 5 is a cross sectional view of the capacitor body shown in FIG. 3.

Referring now to the figures of the drawing in detail and first, particularly, to FIGS. 1 and 2 thereof, there is shown the basic shape of a capacitor body 1 for a 9-pin plug connector. It is self-evident that this embodiment is not restricted to plug connectors. The base plate 2 is fitted with columns that project from both sides of the base plate 2 and are formed by the column elements 3 and 4. Associated column elements 3 and 4 are aligned in the through direction—as can be seen clearly in FIG. 2. These column elements 3 and 4—as shown in FIG. 2—are passed through through-channels 5, through which the signal plate (FIG. 5 shows one in this through-channel 5) runs and either itself forms the hot electrode or is connected to metallic wall coatings on the inner wall of the through-channels 5, as a hot electrode. The overall length of the columns of the individual capacitors is then the sum of the lengths of the column elements 3 and 4 plus the thickness of the base plate 2. In this case, these lengths of the column elements are between ⅓ and ⅔ of the overall length, with a relatively short column element 3 and a relatively long column element 4 in each case being associated, and forming the column of one of the capacitors.

Figure 3:
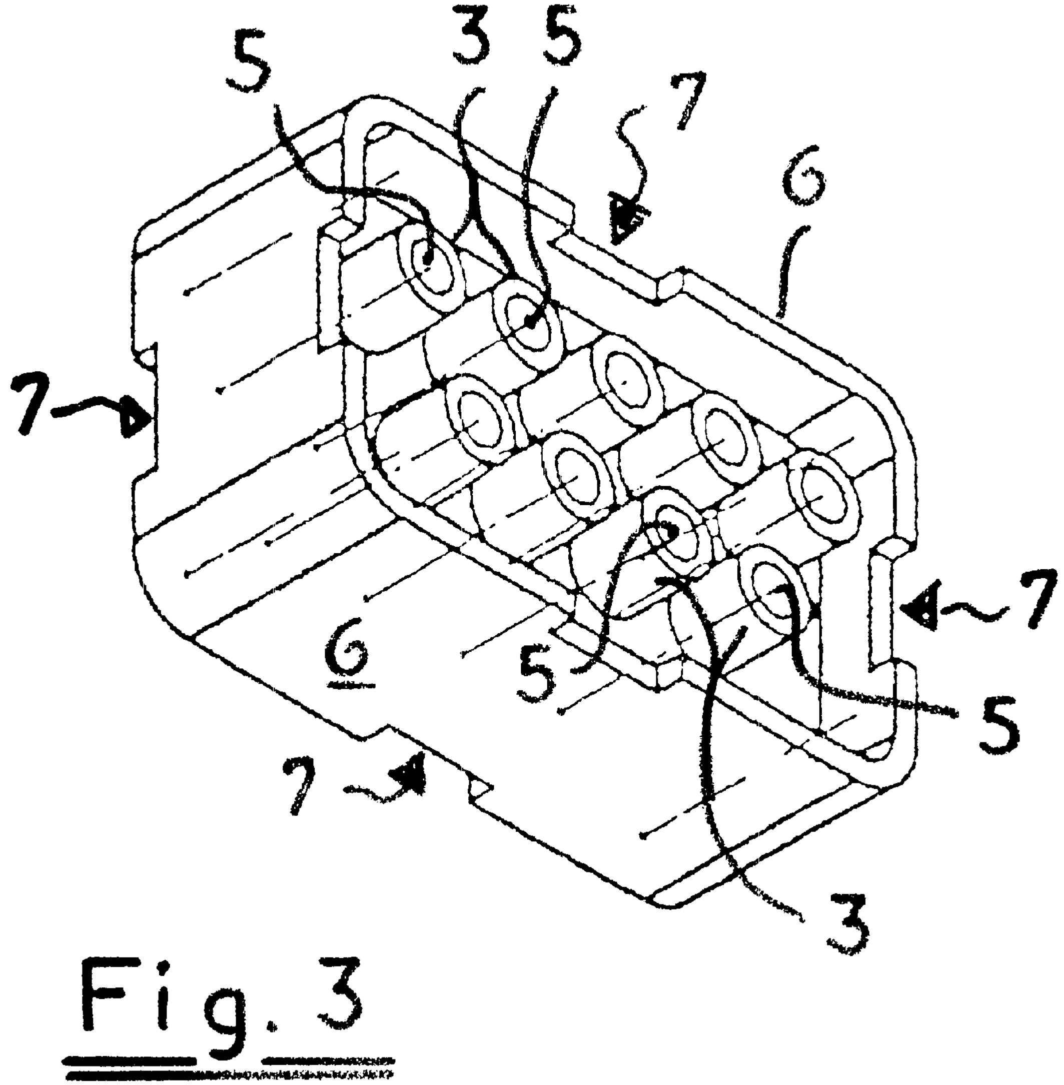
FIG. 3 is a perspective view of a capacitor body having an approximately centrally arranged base plate and column-like individual capacitors, surrounded by a protective ring.
Figure 4:
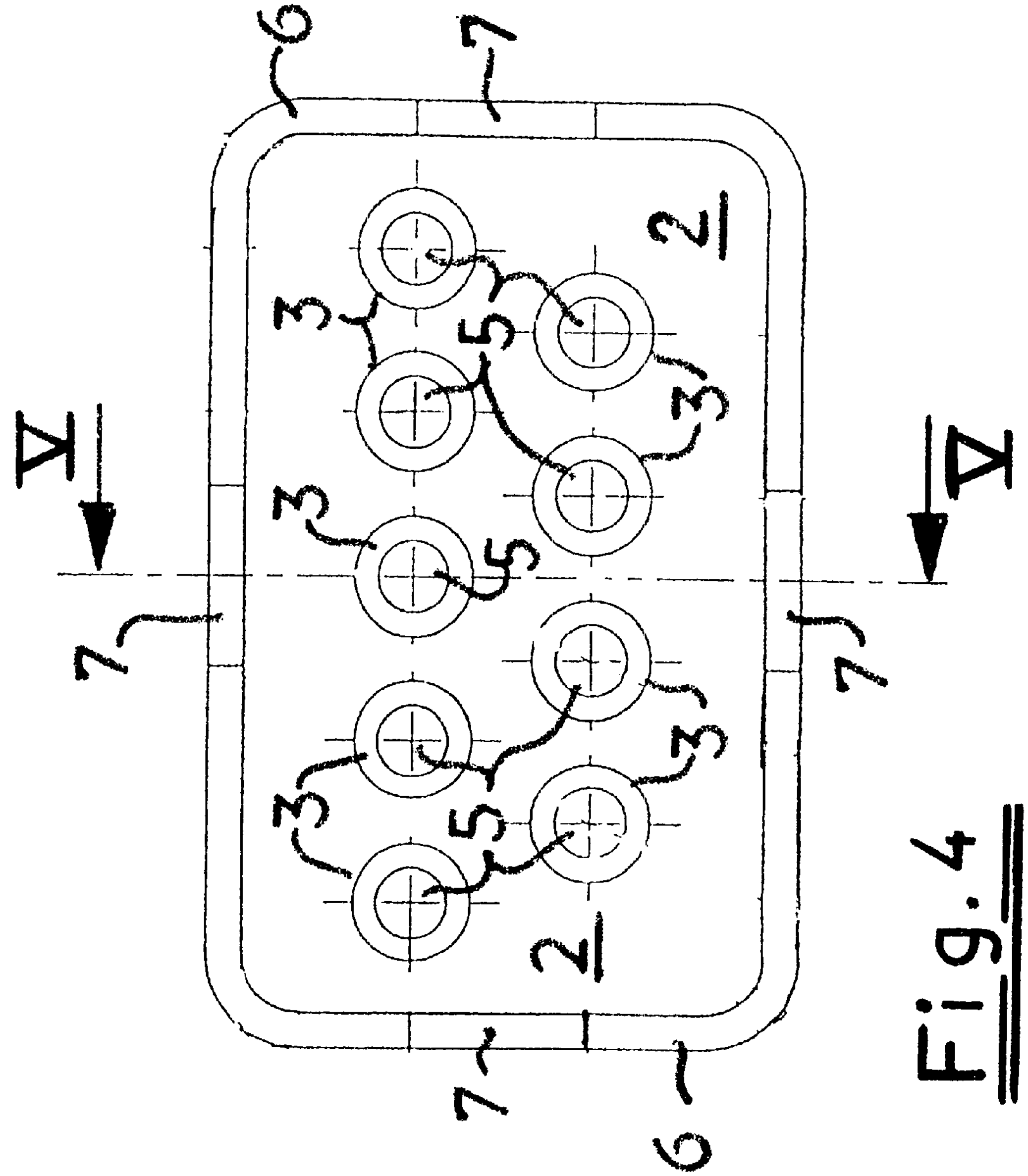
FIG. 4 is a plan view of the capacitor body shown in FIG. 3.

FIGS. 3 to 5 show a perspective view, a plan view, and a cross sectional view, respectively, of one embodiment of a capacitor body 1 for a 9-pin plug connector. The capacitor body 1 has a protective ring 6. Here—as can be seen in the cross sectional view of FIG. 5—the base plate 2 is moved inward and the columns of the capacitors in this case form column elements 3 and 4, which have been described in more detail above.

This assembly of columns is surrounded in a protective manner by a protective ring 6, which is integrally formed with the base plate 2 so that this protective ring also results in a monolithic structure. Indentations 7 may be formed in the edge areas of the protective ring 6, for example, in order to hold mounting brackets or the like.

Figure 6:
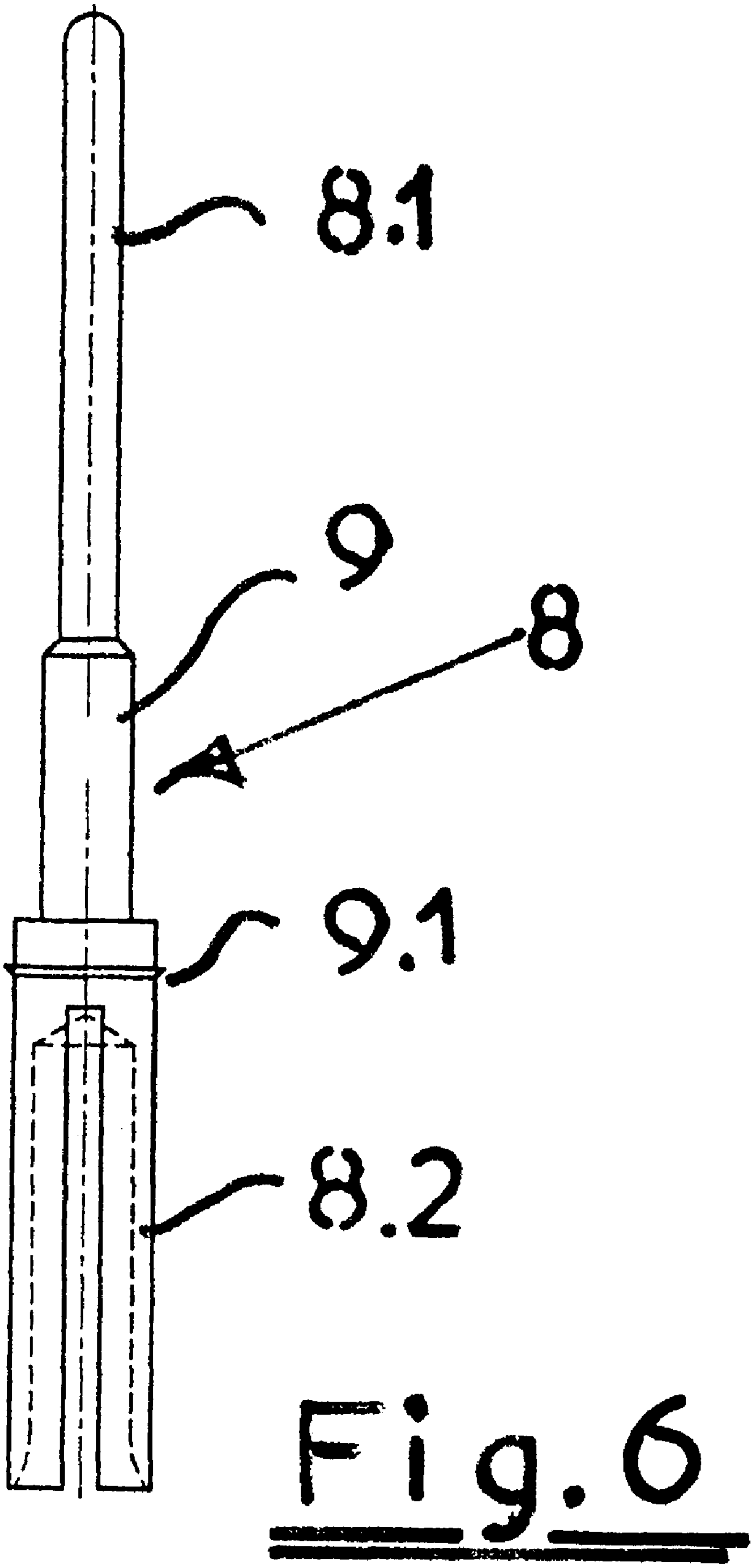
FIG. 6 shows a plug insert with a socket and pin.

FIG. 6 shows a plug insert 8 having a plug pin 8.1 at one end and a plug socket 8.2 at the other end. It is self-evident that plug pins 8.1, plug sockets, or soldering or crimping attachments can also be provided at both ends of the plug inserts 8, depending on the application. The plug pin 8.1 and plug socket 8.2 of the plug insert 8 are connected by a shank 9, which is inserted in an interlocking manner with a good press fit into the through-channel 5. This ensures a press fit which guarantees the mechanical robustness as well as the electrical connection to the metallization engaging over in the through-channel 5 forming the signal plate 14. Soldering can also be provided in order to ensure that contact is made. The metallization on the base plate, which extends roughly as far as the column element 3 or 4 and which—for example, via the narrow faces—is electrically connected to the housing which is formed by the shells 11 and 12 (See FIG. 7), which in this case forms the ground plate 15.

Figure 7:
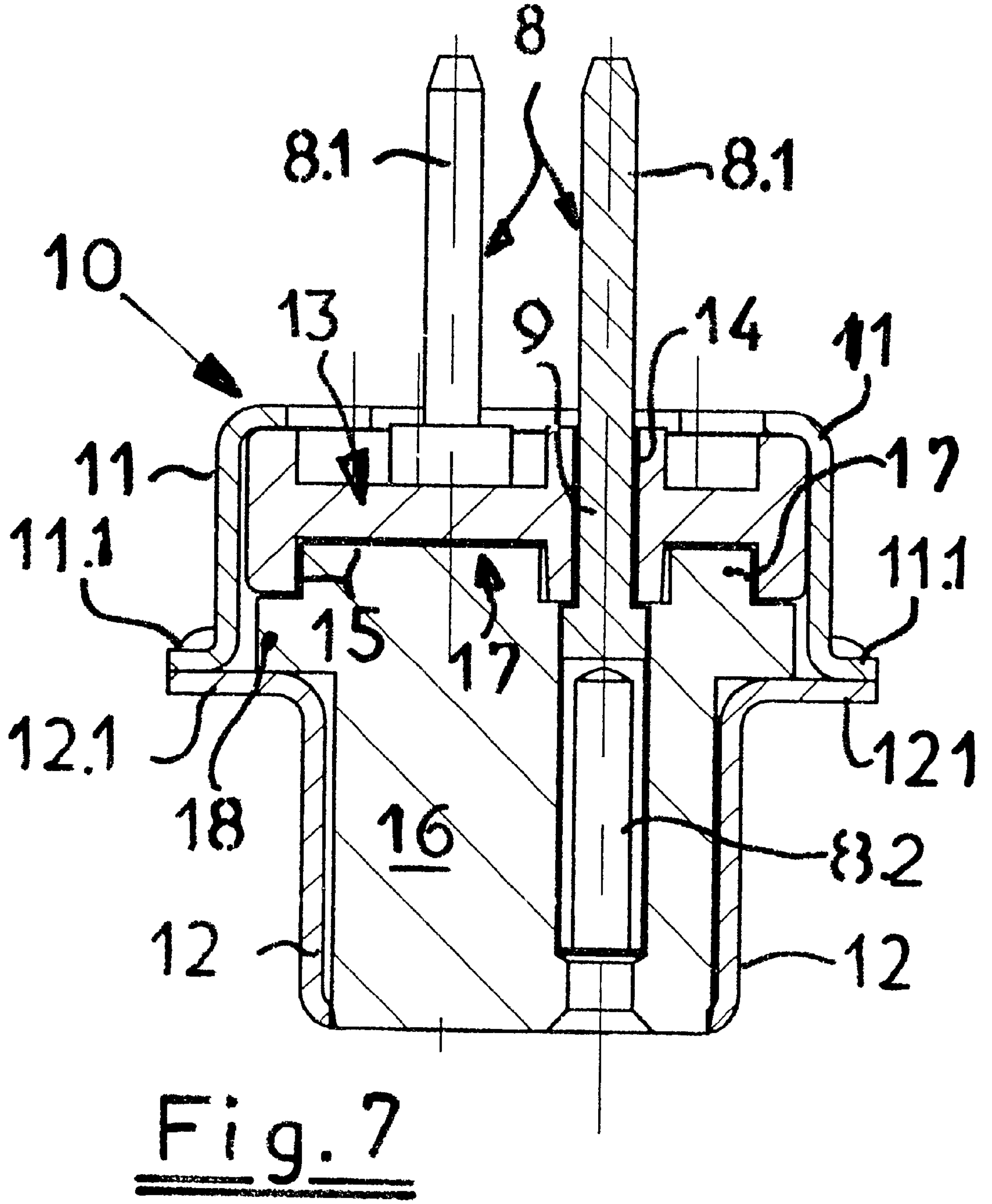
FIG. 7 shows a filter plug using a capacitor produced with the inventive capacitor body.

Referring to FIG. 7, the capacitor 13 formed in this way is inserted into an upper shell 11 in order to produce a filter plug 10, which upper shell 11 engages circumferentially over the edge of the capacitor, while the area of the through-channels 5 with the inserted plug inserts 8 is free, in order to prevent short-circuits between the signal plates, which are guided by the plug inserts 8 and the housing, which is at ground potential.

A lower shell 12 is placed against the upper shell 11, and its circumferential hinges 11.1 and 12.1 are peened over. These peened-over edges 11.1 and 12.1 rest on one another after assembly and are firmly connected to one another—for example by soldering or welding. In order to hold the capacitor 13 in its position, a molding 16 is inserted, which is designed such that it can be inserted in a roughly interlocking manner into the lower shell 12, which engages under its circumferential edge 18. This molding 16 is provided with holes that hold the rearward parts and plug inserts 8 having a locking ring 9.1 such that the plug inserts 8 can be fixed in these through-holes. The molding 16 is provided with projections 17 on its side facing the capacitor 13. These projections 17 likewise engage roughly in an interlocking manner in recesses between the column elements 4 of the capacitor body 1. The capacitor 13 that is inserted into the housing of the filter plug 10, is thus fixed by this molding 16 when the upper shell 11 and the lower shell 12 of the housing are firmly connected to one another.

We claim:

1. A monolithically constructed ceramic capacitor body for multiple capacitors, the capacitor body comprising:

a base plate provided with a metal coating, said base plate formed with a plurality of through-channels, said base plate having a first side and a second side, said first side and said second side being provided with metallization forming a ground coating for being held at a ground potential; and a plurality of individual column-shaped capacitors each including at least a first column element extending outward from said first side of said base plate and a second column element aligned with said first column element and extending outward from said second side of said base plate.

2. The capacitor body according to claim 1, wherein:

each one of said plurality of said column-shaped capacitors has an overall length; and said first column element has a length in a range from ⅓ to ⅔ of said overall length.

3. The capacitor body according to claim 2, wherein said second column element has a length in a range from ½ to ⅔ of said overall length.

4. The capacitor body according to claim 1, comprising a protective ring surrounding said base plate and formed integral with said base plate.

5. The capacitor body according to claim 4, wherein:

each one of said plurality of said column-shaped capacitors has opposing end faces defining planes; and said protective ring is not guided past said planes of said end faces.

6. The capacitor body according to claim 4, wherein:

each one of said plurality of said column-shaped capacitors has an end face defining a plane; and said protective ring is not guided past said plane of said end face.

7. A capacitor, comprising:

a plurality of insert pins; and the capacitor body according to claim 1;

said plurality of said through-channels having inner surfaces provided with metallization;

said metallization forming signal plates or being conductively connected to signal plates;

at least said first side of said base plate provided with metallization forming a ground coating for being held at a ground potential;

each one of said plurality of said insert pins including a plug pin, a plug socket or a soldering or crimping attachment, said plurality of said insert pins being inserted into said plurality of said through-channels; and each one of said plurality of said insert pins having a shank being press fit into said plurality of said through-channels.

8. A filter plug, comprising:

a capacitor including a plurality of insert pins, and the capacitor body according to claim 1;

a housing having an upper shell and a lower shell, said capacitor inserted into said housing; and a molding resting on said capacitor and securing said capacitor in said housing;

said plurality of said through-channels having inner surfaces provided with metallization;

said metallization forming signal plates or being conductively connected to signal plates;

each one of said plurality of said insert pins including a plug pin, a plug socket or a soldering or crimping attachment, said plurality of said insert pins being inserted into said plurality of said through-channels; and each one of said plurality of said insert pins having a shank being press fit into a respective one of said plurality of said through-channels.

9. A monolithically constructed ceramic capacitor body for multiple capacitors, the capacitor body comprising:

a base plate provided with a metal coating, said base plate formed with a plurality of through-channels, said base plate having a first side and a second side, a protective ring surrounding said base plate and formed integral with said base plate; and a plurality of individual column-shaped capacitors each including at least a first column element extending outward from said first side of said base plate and a second column element aligned with said first column element and extending outward from said second side of said base plate.

10. The capacitor body according to claim 9, wherein:

each one of said plurality of said column-shaped capacitors has an overall length; and said first column element has a length in a range from ⅓ to ⅔ of said overall length.

11. The capacitor body according to claim 10, wherein said second column element has a length in a range from ⅓ to ⅔ of said overall length.

12. The capacitor body according to claim 9, wherein:

each one of said plurality of said column-shaped capacitors has opposing end faces defining planes; and said protective ring is not guided past said planes of said end faces.

13. The capacitor body according to claim 9, wherein:

each one of said plurality of said column-shaped capacitors has an end face defining a plane; and said protective ring is not guided past said plane of said end face.

14. A capacitor, comprising:

a plurality of insert pins; and the capacitor body according to claim 9;

said plurality of said through-channels having inner surfaces provided with metallization;

said metallization forming signal plates or being conductively connected to signal plates;

at least said first side of said base plate provided with metallization forming a ground coating for being held at a ground potential;

each one of said plurality of said insert pins including a plug pin, a plug socket or a soldering or crimping attachment, said plurality of said insert pins being inserted into said plurality of said through-channels; and each one of said plurality of said insert pins having a shank being press fit into said plurality of said through-channels.

15. The capacitor according to claim 9, wherein said second side of said base plate is provided with metallization.

16. A filter plug, comprising:

a capacitor including a plurality of insert pins, and the capacitor body according to claim 9;

a housing having an upper shell and a lower shell, said capacitor inserted into said housing; and a molding resting on said capacitor and securing said capacitor in said housing;

said plurality of said through-channels having inner surfaces provided with metallization;

said metallization forming signal plates or being conductively connect to signal plates;

at least said first side of said base plate provided with metallization forming a ground coating for being held at a ground potential;

each one of said plurality of said insert pins including a plug pin, a plug socket or a soldering or crimping attachment, said plurality of said insert pins being inserted into said plurality of said through-channels; and each one of said plurality of said insert pins having a shank being press fit into a respective one of said plurality of said through-channels.

* * * * *